United States Patent [19]

Morris

[11] Patent Number: 4,568,595
[45] Date of Patent: Feb. 4, 1986

[54] COATED CERAMIC STRUCTURE AND METHOD OF MAKING SAME

[76] Inventor: Jeffrey R. Morris, R.D. #1, Scio, N.Y. 14880

[21] Appl. No.: 604,379

[22] Filed: Apr. 26, 1984

[51] Int. Cl.⁴ .............................................. B32B 3/12
[52] U.S. Cl. ..................................... 428/116; 156/89; 264/44; 264/59; 428/65
[58] Field of Search .......................... 428/116, 65, 118; 156/89; 264/44, 59

[56] References Cited

U.S. PATENT DOCUMENTS

| | | | |
|---|---|---|---|
| 3,090,094 | 5/1963 | Walder et al. | 264/59 X |
| 3,106,503 | 8/1963 | Randall et al. | 428/118 X |
| 3,112,184 | 11/1963 | Hollenbach | 428/116 X |
| 3,272,686 | 9/1966 | Smith et al. | 428/116 |
| 3,616,841 | 11/1971 | Walz | 264/59 X |
| 3,632,385 | 1/1972 | Schmitt et al. | 428/116 X |
| 3,778,336 | 12/1973 | Adams | 264/44 X |
| 3,799,796 | 3/1974 | Hunter | 427/227 |
| 3,946,039 | 3/1976 | Walz | 264/59 X |
| 3,949,137 | 4/1976 | Akrongold et al. | 428/15 X |
| 4,302,502 | 11/1981 | Narumiya | 428/701 X |

FOREIGN PATENT DOCUMENTS 916784  1/1963  United Kingdom .................. 156/89

*Primary Examiner*—Henry F. Epstein
*Attorney, Agent, or Firm*—Webb, Burden, Robinson & Webb

[57] ABSTRACT

A ceramic structure comprises a reticulated ceramic portion defined by a plurality of interconnecting webs having a pore distribution of between 5 and 125 (ppi) pores per linear inch and a ceramic coating portion sintered to the webs along a surface defined by one face of said coating. The coating has a thickness less than about 3 millimeters. The ratio of average thickness of the coating to the thickness of the web forming the reticulated ceramic is between 1 and 10.

5 Claims, 3 Drawing Figures

COATED CERAMIC STRUCTURE AND METHOD OF MAKING SAME

BACKGROUND OF THE INVENTION

Reticulated ceramics, in other words, sintered ceramic foams have found numerous applications. They comprise a unique two-phase system. A continuous solid phase is interspersed in a continuous pore phase extending in all directions. The solid phase is made from a relatively inert ceramic material (high temperature resistant, inorganic materials, usually oxides, carbides, etc.). They are useful for filtering hot fluids such as diesel exhaust or liquid metals and as furnace insulation. Methods of producing a reticulated ceramic are disclosed in Schwartzwalder et al. U.S. Pat. No. 3,090,094 and British Pat. No. 916,784.

It is an object of this invention to provide reticulated ceramics having an integral, thin ceramic coating to close off the pore phase at selected locations and yet to retain the desirable properties of the reticulated ceramic. It is a special object of this invention to provide a ceramic article having a reticulated portion and a thin ceramic coating sintered together and matched to minimize thermal shock.

The thickness of the continuous layer formed in this way is unpredictable and tends to be many times the thickness of the webs comprising the reticulated portion. The coarser the pores of the reticulated portion (say less than thirty pores per inch) the more difficult it is to provide a thin continuous layer by the dipping process. Nevertheless, as may be expected, the surface layers formed by the dipping process are well knit to the reticulated layer being in contact with internal web surfaces. Applicants have found that an article with improved properties can be formed by a technique that results in much less contact between the web surfaces at the sealing layer. Moreover, the sealing layer will have an easily controlled uniform thickness. The articles made according to this invention will have improved thermal shock resistance due to the matching of the average thickness of the webs with the thickness of the ceramic sheets and the more than adequate adhesion between the surface and the reticulated portion.

It is often desirous for refractory materials to be inert to elevated temperatures, corrosive environments and rapid changes in temperature while maintaining its strength and structural integrity. It is further desirous to maximize these properties while minimizing heat capacity and thermal conductivity. There are many types of refractories available today ranging from the very dense fused cast types to the highly insulating fiber types. The fiber refractories have very low thermal conductivity and heat capacity which is desirous. The shortcomings of fiber refractories are low load bearing capability and low corrosion resistance along with shrinkage at the upper use temperature limits. The dense and insulating type refractories generally have good strength at temperature and are capable of being formed from corrosion and erosion resistant materials. The shortcomings of these materials, be it the preformed or monolith type, is that they have relatively high heat capacity due to their inherent mass. Due to the high heat capacity, the energy requirements to bring these materials to temperature is much greater than the fiber insulation.

It is an object of this invention to provide an improved refractory material, be it alone or in conjunction with fiber insulation, which will not compromise the desired load bearing properties and corrosion-erosion resistance for low heat capacity. This ceramic refractory structure or reticulated ceramic possesses good load bearing strength, corrosion-erosion resistance yet has a low thermal conductivity, low heat capacity and excellent thermal shock resistance.

SUMMARY OF THE INVENTION

Briefly, according to this invention, there is provided a ceramic structure comprising a reticulated ceramic portion defined by a plurality of interconnecting webs and a ceramic coating portion sintered to the webs along a surface defined by one side of the coating. Preferably, the coating has substantially the same composition as the reticulated portion. The reticulated ceramic portion has a pore distribution between 5 and 125 pores per linear inch (p.p.i.) and the coating has a thickness less than 3 millimeters. Preferably, the coating is at least 0.25 millimeter thick. The ratio of the average thickness of the coating to the average thickness of the web forming the reticulated ceramic is between 1 and 10.

There is also provided a method of manufacturing a ceramic structure comprising the steps for preparing a reticulated ceramic portion and subsequently providing a coating thereon. The coating is provided by troweling, brushing or spraying a suitable ceramic slurry gently over at least a portion of a surface of the reticulated portion. The sprayed coatings have a thickness between about 0.25 and 0.50 millimeter and are suitable for use on reticulated ceramics having a pore size between about 65 and 125 ppi. The coatings provided by troweling or by the use of a doctor blade have a thickness between about 0.5 and 3 millimeters and are suitable for use with reticulated ceramics having a pore size from as large as 5 ppi to the very fine. The larger the pore size, the larger the thickness of the coating tends to be. The coated structure is fired to form a sintered ceramic bond between the reticulated portion and the coating.

The ceramic structure defined herein may comprise a filter or molten metal in which case the reticulated ceramic portion has a coated surface substantially parallel to the direction of flow through the filter. The structure according to this invention may comprise a heat exchanger in which case it comprises two reticulated ceramic portions separated by a coated surface portion which is sintered to each of them. Means are provided to direct flow of hot fluids through the reticulated ceramic on one side of the sheet portion and means are provided to direct flow of cooling fluid through the reticulated ceramic on the other side of the sheet portion. The ceramic structure defined herein may be used as kiln furniture comprising a reticulated ceramic base having a thin ceramic coating. Depending upon the application, the coating may be placed adjacent to or away from the ware being supported by the kiln furniture.

Still further, the ceramic structure disclosed herein may be used by itself or in conjunction with fiberboard or fiber blanket as a refractory material for lining furnaces.

THE DRAWINGS

Further features and other objects and advantages of this invention will become clear from the following detailed description made with reference to the drawings in which FIG. 1 is a pictorial view of a ceramic filter for molten metal according to this invention;

FIG. 2 is a pictorial view of an item of kiln furniture according to this invention; and FIG. 3 is a pictorial cut away view of a furnace lining according to this invention.

DESCRIPTION OF THE PREFERRED EMBODIMENTS

Figure 1:
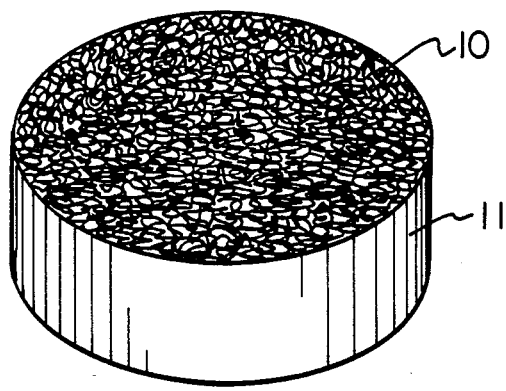

FIG. 1 illustrates a useful article according to this invention which is a ceramic filter for molten metal. A central portion 10 comprises reticulated ceramic having the outward shape of a disk. The outer cylindrical surface of the disk has a thin ceramic coating 11 sintered thereto. The cylindrical surface is, of course, generally parallel to the flow of hot metal through the pores of the reticulated ceramic. Coating the reticulated ceramic with a material that becomes integral therewith increases the strength of the entire unit. FIG. 1 actually illustrates an insert to be rested in a supporting structure comprising a funnel or the like for directing the molten metal to the reticulated ceramic. The coated molten metal filter is less friable during handling and insertion into the pour cup or tundish. It also eliminates the ability of the metal to short circuit the filter by flowing to the peripheral edge of the filter and out along the filter cup interface. It also improves the compressive strength of the filter.

Ceramic materials suitable for making filters for vacuum induction melted super alloys are mullite, partially stabilized zirconia, and alumina (90–98%). Mullite and zirconia are preferably used due to their better thermal shock resistance. The pore sizes most commonly used are 10, 20, and 30 ppi with 10 and 20 ppi being the preferred. The 30 ppi will generally have the highest filtration efficiency but the reduced flow can make this prohibitive for many applications.

For making filters for air-melted ferrous alloys a strong, thermal shock, and creep resistant material is required. The materials for these applications are preferably partially stabilized zirconia, various grades of high alumina and mullite for smaller volume pores. Pore size of 5–7 ppi, 10 ppi and 20 ppi are used for this application.

For air-melted nonferrous metals, mullite material is preferred along with the alumina compositions. Pore sizes ranging from 10 ppi to 65 ppi have been used successfully. The promising results in one application involved using a 65 ppi mullite filter in a cylindrical geometry. The fine pore materials (30 ppi, 45 ppi, 65 ppi) show the highest filtration efficiency.

Figure 2:
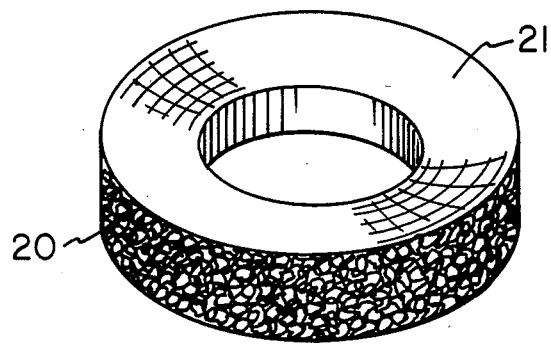

FIG. 2 illustrates a useful article according to this invention comprising an item of kiln furniture for a plate. The item comprises a base portion 20 of reticulated ceramic, the upper side of which is shaped to conform to the underside of the plate or ware to be fired. Allowance for shrinkage of the ware is made. It is often desirous to have a smooth, flat surface on which to set the ware to facilitate the ability of the shrinking ware to slide easily. This is accomplished by sintering a thin ceramic coating 21 to the shaped surface of the reticulated ceramic. There exists a minimal increase in heat capacity of the item which is advantageous because it permits the available heat to be used to process the ware.

There is a continuous effort to reduce the mass of the kiln setting material to enhance fuel savings. To reduce firing cycle times, kiln furniture must be more thermal shock resistant. The use of reticulated ceramics has a tremendous potential especially in the electronics field where the ratio of setter mass to product mass is large. Low mass furniture will be best suited for situations where a high setter to product mass ratio exists since these materials may potentially creep under high loads at upper use temperatures. Mullite and high alumina products of the finer pore sizes are the preferred materials. It should be noted that in applications such as setter plates for the electronic industry, where the ceramic components contain a high percentage of organics, the porous nature of the reticulated ceramic is advantageous because there is less pressure developed at the contact surfaces when the volatiles are burning off. In this case, the coating of the reticulated portion is not placed adjacent the workpiece.

Figure 3:
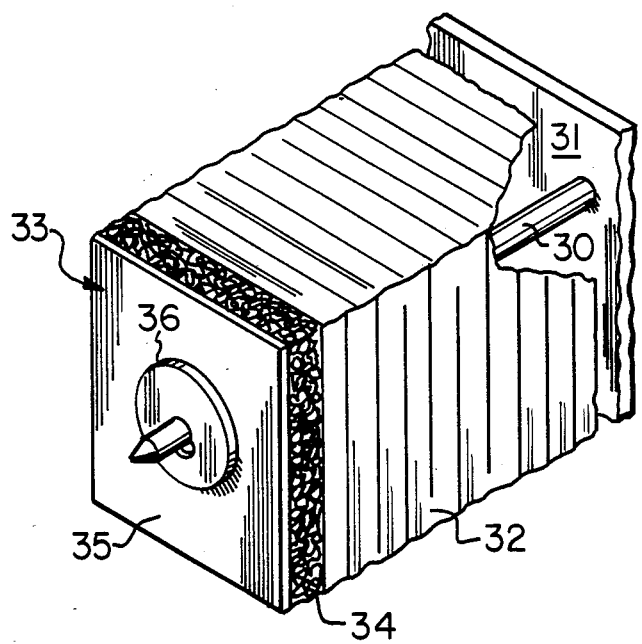

Referring now to FIG. 3, there is shown a portion of a furnace liner according to this invention. An elongated ceramic anchor 30 is secured to a metal shell 31. Inwardly of the shell is a fiber blanket 32. Inwardly of the fiber blanket is a coated ceramic member 33 substantially as described herein. The coated ceramic member comprises a reticulated portion 34 and a coating 35. It is preferred that the coated refractory be comprised of at least one reticulated ceramic portion between two coating portions. Moreover, it is preferred that the coated refractory be comprised of two or more reticulated ceramic portions separated by a plurality of substantially parallel coatings. The composite refractory should be oriented such that the coating portions are substantially perpendicular to the direction of heat flow. The anchor passes through an opening in member 33 and is secured to the anchor by a key 36. The coated ceramic and refractory fiber blanket can be formed into modular units with the refractory fiber blanket being bonded to the reticulated ceramic side of the coated structure with a refractory cement. A suitable refractory cement is calcium aluminate cement. The fiber blanket may be replaced by another ceramic fiber refractory including a refractory felt, a refractory fiber block or refractory fiberboard. Ceramic fiber refractories are all slightly compressible when new.

The module, a portion of which is shown in FIG. 3, can be easily installed in a furnace and provides the excellent thermal insulation of fiber refractories and an erosion resistant surface which will not shrink (say at 3,000° F. in the case of an alumina refractory sheet). It is more durable than mere fiber refractory and does not have the problem of dusting and damage when brushed against. The dusting and damage problems are very apparent with fiber insulation after a short period of use at high temperatures. At these temperatures embrittlement occurs due to sintering and recrystallization and the unprotected ceramic fiber refractory loses its compressibility.

The need for a low mass, highly insulating material that is rigid, nonfriable, corrosive/erosive resistant and does not shrink at upper use temperatures commends reticulated ceramics as a furnace lining material. Using the reticulated ceramics in conjunction with fiber insulation enhances the fiber lined furnace concept. These panels are preferably made from mullite with pore sizes ranging from 45 ppi to 100 ppi. The surfaces are closed off by applying a dense coating to the reticulated ceramics. With this system, the desired properties such as thermal shock resistance, low thermal conductivity, minimal heat storage along with ease of application are still intact while the common fiber problems such as friability, dusting, erosion or corrosion and shrinkage due to devitrification and sintering are greatly improved. Another important consideration is that these panels are load bearing therefore burner blocks can be supported by the hot face material. This is very important when retrofitting a brick furnace with fiber insulation. These materials can be made out of high performance oxides such as 98% alumina and zirconia which is a difficult and expensive process when forming fibers from the same materials.

A structure as described with reference to the drawings may be fabricated as follows: The reticulated ceramic portion is prepared by immersing an open celled, porous, organic material (for example, urethane foam) in a slurry of finely divided ceramic powder (for example, mullite) having a binder therein. In this way, the walls of the porous material are coated. Excess slurry is removed. The coated material is then fired to burn out the organic material and to form a ceramic bond (sintered bond) between the finely divided ceramic particles. In this way, the internal structure of the porous material is replicated.

The physical properties of certain reticulated ceramics after firing are set forth in the following tables.

TABLE I

Lithium Aluminosilicate

| | | |
|---|---|---|
| Maximum use temperature | 1250° C. | |
| Thermal shock resistance | Excellent | |
| Thermal expansion coefficient | $0.38 \times 10^{-6}$ in/in/°C. | |

Pore Size Dependent Properties

| ppi | 10 | 20 | 30 |
|---|---|---|---|
| Transverse Strength (psi) | 75 | 125 | 190 |
| Compressive Strength (psi) | 80 | 100 | 150 |
| Unit Density (g/cm$^3$) | | 0.36 | 0.34 |
| Unit Porosity (%) | | 82.0 | 83.0 |

TABLE II

Mullite

| | |
|---|---|
| Maximum use temperature | 1650° C. |
| Thermal shock resistance | Good |
| Thermal expansion coefficient | $4.90 \times 10^{-6}$ in/in/°C. |
| Creep rate | 0.15% deformation/hr. 5 psi load at 1500° C. 10 ppi |

Pore Size Dependent Properties

| ppi | 10 | 20 | 30 |
|---|---|---|---|
| Transverse Strength (psi) | 203 | 333 | — |
| Compressive Strength (psi) | 228 | 445 | — |
| Pore size (mm) | 1.186 | .746 | .614 |
| Web Size (mm) | .674 | .481 | .283 |
| Unit Density (g/cm$^3$) | 0.455 | 0.474 | 0.448 |
| Unit Porosity (%) | 78.31 | 76.73 | 81.15 |

TABLE III

Zirconia (partially stabilized)

| | |
|---|---|
| Maximum use temperature | 1800° C. |
| Thermal shock resistance | Excellent |
| Thermal expansion coefficient | $7.80 \times 10^{-6}$ in/in/°C. |
| Creep rate | 0.25% deformation/hr. 35 psi load at 1500° C. 10 ppi |

Pore Size Dependent Properties

| ppi | 10 | 20 | 30 |
|---|---|---|---|
| Transverse Strength (psi) | 324 | 489 | |
| Compressive Strength (psi) | 365 | 286 | |
| Pore Size (mm) | 1.407 | .835 | |
| Web Size (mm) | .456 | .352 | |
| Unit Density (g/cm$^3$) | 0.939 | 1.178 | |
| Unit Porosity (%) | 80.67 | 77.19 | |

TABLE IV

98% Alumina

| | |
|---|---|
| Maximum use temperature | 1750° C. |
| Thermal shock resistance | Fair |
| Thermal expansion coefficient | $8.85 \times 10^{-6}$ in/in/°C. |

Pore Size Dependent Properties

| ppi | 10 | 20 | 30 |
|---|---|---|---|
| Transverse Strength (psi) | 217 | 472 | 419 |
| Compressive Strength (psi) | 323 | 411 | — |
| Pore Size (mm) | 1.305 | .825 | .673 |
| Web Size (mm) | .573 | .335 | .318 |
| Unit Density (g/cm$^3$) | 0.446 | 0.493 | 0.685 |
| Unit Porosity (%) | 80.88 | 78.35 | 70.49 |

TABLE V

90% Alumina

| | |
|---|---|
| Maximum use temperature | 1700° C. |
| Thermal shock resistance | Good |
| Thermal expansion coefficient | $6.52 \times 10^{-6}$ in/in/°C. |
| Creep rate | 0.15% deformation/hr. 35 psi load at 1500° C. 10 ppi |

Pore Size Dependent Properties

| ppi | 10 | 20 | 30 |
|---|---|---|---|
| Transverse Strength (psi) | 114 | 144 | — |
| Compressive Strength (psi) | 174 | 165 | — |
| Pore Size (mm) | 1.516 | .810 | .625 |
| Web Size (mm) | .606 | .331 | .304 |
| Unit Density (g/cm$^3$) | 0.435 | 0.442 | 0.504 |
| Unit Porosity (%) | 79.83 | 78.83 | 75.39 |

Surface coatings are applied by various methods such as troweling, brushing, spraying or with a doctor blade directly on the fired pieces. Spray coating is applicable to reticulated ceramics having a pore size from 65 ppi to 100 ppi.

An example of the formulation for a 2000 gram batch of 98% alumina spray coating slurry is as follows:

Alumina: 1,960 grams
Silica: 100 grams
Organic binder: 200 grams
Surfactant: 5 milliliters
H$_2$O: 1,000 milliliters The materials are mixed under high shear until creamy then viscosity adjustments may be made. The surfactant aids in forming a dispersion of the ceramic in the liquids.

The viscosity range will be between 250 and 1500 centipoise with a desired viscosity of 500 centipoise. The slurry, is sprayed at a pressure of 70 psi starting at a working distance of 2 inches making numerous passes and backing off to 4 inches. This surface can then be wiped with a pliable brush, such as a 65 ppi foam to improve surface uniformity.

The proper spray viscosity is dependent on the ceramic composition. For instance, in a zirconia system, partially stabilized with magnesia, a viscosity range of 1000 to 6000 centipoise may be used with 4000 centipoise being preferred. In a mullite system, a spray viscosity ranging from 250 to 4000 centipoise may be used with 1500 centipoise being preferred.

A slip coated system which is applied by a doctor blade type principle is applicable to all pore sizes. A typical formulation for a 2000 gram batch of alumina coating slurry is as follows:
Alumina: 1,960 grams
Silica: 100 grams
Organic binder: 200 grams
Surfactant: 5 milliliters
$H_2O$: 750 milliliters Again in this process the slip coating viscosity is dependent on composition. A slip coating viscosity for the above example would range from 20,000 centipoise to 30,000 centipoise with a preferred viscosity being 25,000 centipoise. The mullite composition would have a viscosity of 22,000 centipoise. The zirconia, partially stabilized with $M_gO$ system has a slip coating viscosity range of 15,000 to 40,000 centipoise with a preferred viscosity being 25,000 to 30,000 centipoise.

The slip coating is applied by having the parts moving on a conveyor with controllable speed and passed under a stiff rubber blade. The distance between the blade and the surface of the part can be accurately controlled. The slurry is dispensed as evenly as possible in front of the blade which coats the surface of the reticulated ceramic as it moves by. The parts are placed in a dryer at 60° C. with moving air with drying time being dependent on part size.

After drying the coated ceramics are fired or burned at a temperature and for a time appropriate to their compositions. These times and temperatures are well known by those skilled in the ceramic arts.

Pore size, web and coating thickness of coated ceramics according to this invention can be measured, for example, using a binocular zoom microscope with calibrated filar eyepiece. In the following table, typical measurements for coated ceramics according to this invention are set forth.

|  | 10 ppi Slip Coated | 20 ppi Slip Coated | 30 ppi Slip Coated | 65 ppi Spray Coated | 65 ppi Slip Coated | 100 ppi Spray Coated | 100 ppi Slip Coated |
|---|---|---|---|---|---|---|---|
| Coating thickness (mm) | 2.36 | 2.31 | 1.40 | 0.40 | 0.625 | 0.53 | 0.45 |
| Pore size (mm) | 1.3 | 0.76 | .6 | .28 | .35 | .23 | .25 |
| Web thickness (mm) | .66 | .40 | .36 | .07 | .07 | .07 | .05 |
| Coating/web thickness ratio | 3.6 | 5.6 | 3.9 | 5.3 | 8.3 | 7 | 9 |

The 90 and 98% alumina, mullite and stabilized zirconia coated reticulated ceramic shapes described herein are useful for molten metal filtration, corrosion resistant catalytic supports, light weight insulation, low mass kiln furniture and specialty refractories. The lithium aluminosilicate coated reticulated ceramic shapes described herein are useful for catalytic supports and pollutant particle traps for gasoline, diesel and woodburning stoves.

Having thus described the invention with the detail and particularity required by the Patent Laws, what is desired to be protected by Letters Patent is set forth in the following claims.

I claim:

1. A ceramic structure comprising:
   (a) a reticulated ceramic portion defined by a plurality of interconnecting webs having a pore distribution of between 5 and 125 pores per linear inch and
   (b) a ceramic coating portion sintered directly to the webs along a surface defined by one face of said coating, said coating having a thickness between about 0.25 and 3 millimeters, and the ratio of average thickness of the coating to the thickness of the webs forming the reticulated ceramic being between 1 and 10.

2. A method of manufacturing a ceramic structure comprising the steps for:
   (a) preparing a reticulated ceramic having a plurality of interconnecting webs having a pore distribution between 125 and 65 pores per linear inch.
   (b) subsequently spraying a ceramic slurry directly upon at least one surface of the reticulated ceramic to form a coating having a thickness between about 0.25 and about 0.50 millimeter thick,
   (c) firing the composite structure.

3. The method according to claim 2 wherein the ceramic slurry has a viscosity of between 250 and 6000 centipoise.

4. A method of manufacturing a ceramic structure, comprising the steps for:
   (a) preparing a reticulated ceramic having a plurality of interconnecting webs having a pore distribution between about 125 and about 5 pores per linear inch.
   (b) subsequently troweling a ceramic slip directly upon at least one surface of the reticulated ceramic to form a coating between 0.5 and 3 millimeters thick,
   (c) firing the composite structure.

5. The method according to claim 4 wherein the ceramic slip has a viscosity of between 15,000 and 40,000 centipoise and the coating has a thickness between about 0.5 and 3 millimeters.

* * * * *